(12) United States Patent
Han

(10) Patent No.: US 6,537,168 B1
(45) Date of Patent: Mar. 25, 2003

(54) VARIABLE SPEED TRANSMISSION SYSTEMS AND ROTARY MOTION CONTROLS

(76) Inventor: Kyung Soo Han, 8712 Rayburn Rd., Bethesda, MD (US) 20817

(*) Notice: Subject to any disclaimer, the term of this patent is extended or adjusted under 35 U.S.C. 154(b) by 7 days.

(21) Appl. No.: 09/689,974

(22) Filed: Oct. 13, 2000

(51) Int. Cl.[7] ................................. F16H 3/72
(52) U.S. Cl. ........................................ 475/8
(58) Field of Search ........................... 475/14, 15, 16, 475/17, 1, 9, 207, 331, 8

(56) References Cited

U.S. PATENT DOCUMENTS

| 2,547,453 A | 4/1951 | Egy |
| 4,077,278 A | 3/1978 | Combastet |
| 4,109,551 A | 8/1978 | Nemec |
| 4,802,376 A | 2/1989 | Stidworthy |
| 4,961,719 A | 10/1990 | Wildermuth |
| 5,016,493 A | 5/1991 | Han |
| 5,108,352 A | 4/1992 | Pires |
| 5,116,292 A | 5/1992 | Han |
| 5,169,359 A | 12/1992 | Han |
| 5,308,293 A | 5/1994 | Han |
| 5,937,701 A | 8/1999 | Mimura |
| 6,068,570 A | 5/2000 | Han |

FOREIGN PATENT DOCUMENTS

| CA | 989644 | 5/1976 |
| FR | 1323617 | 4/1963 |
| FR | 2638801 | 5/1990 |

*Primary Examiner*—Ankur Parekh
(74) *Attorney, Agent, or Firm*—Harpman & Harpman

(57) ABSTRACT

An arrangement of interlinking gear assemblies to define multiple motion control input, output and directional mechanisms capable of varied speed and directional output for constant or varied input sources. The gear assemblies utilize three basic gear elements, that of bevel gear, planetary and spur gear formats to achieve a phase angle control system. Different gear element assembly applications achieve a variety of multiple use and applications including differential, directional change, speed control, compressor use, P.T.O. cycle timer and transmissions of all types including bicycles. Manual and automatic control of transmissions adjustment is dependent on relative input speed to control respective output and selective feedback.

13 Claims, 13 Drawing Sheets

VARIABLE SPEED TRANSMISSION SYSTEMS AND ROTARY MOTION CONTROLS

BACKGROUND OF THE INVENTION

1. Technical Field

This device relates to gear transmissions and the like that provide for adjustable output from a power input source for useful control and output by different relative gear ratios for varied use applications based on three variable elements.

2. Description of Prior Art

Prior art devices of this type have relied on a number of different gear configurations to impart increase or decrease output ratios from a fixed or variable input source, see for example U.S. Pat. Nos. 2,547,453, 4,077,278, 4,109,551, 4,802,376, 4,916,975, 4,961,719, 5,016,493, 5,103,352, 5,116,292, 5,169,359 and 5,937,701. Also see foreign patents, Canadian Patent 989,644, French 2,638,801 and 1,323,617.

In applicant's own prior art U.S. Pat. Nos. 5,116,292, 5,106,493, 5,308,293 and 6,068,570 illustrate the orbital path change to determine variable output.

In U.S. Pat. No. 4,961,719 a variable drive transmission is disclosed using a carrier member mounted on a rotatable crank shaft with a number of spaced pivotally mounted segments that can selectively engage a central sprocket with multiple chain engagement sprockets rotatably secured to each segment.

In U.S. Pat. No. 2,547,453 a variable speed transmission can be seen having a rotatable cage with multiple enclosed cranks. An annular cam is engaged by the cranks from which selective output can be determined.

U.S. Pat. No. 4,077,278 is directed towards dividing input rotation of force into two rotational components. An output differential combines the divided components rotational force.

In U.S. Pat. No. 4,916,975 a torque converter is illustrated with two different gears, input is transferred through each differential gear by planetary shafts which are aligned co-axially to one another.

In U.S. Pat. No. 5,937,701 a variable speed change gear device is illustrated wherein rotation of forces are transferred from an input shaft to an offset housing which in turn is transferred to variable rings so that angular velocities of the variable rings are periodically varied relative the angular velocity of the offset housing.

In French Patent 1,323,619 a gear arrangement having a pair of interconnected differential gear segments is shown.

In Canadian Patent 989,644 a rotary mesh translating device is shown that uses two differentials with a self-locking rotary coupler.

French Patent 2,638,801 is directed towards two different mechanical power converters wherein the cage of the first differential receives input from a motor, converts same to output via inner engaging gear to input shafts of the second differential with output from the cage of the second differential determined therefrom.

SUMMARY OF THE INVENTION

A variable output transmission system having direction, engine braking, and differential output sections for enabling infinitely variable output from constant or variable input source in multiple related venue applications.

A motion controlled system utilizing multiple gear and cam assemblies for speed control of variable or constant input with variable or constant output from single and multiple input and output sources. Control assemblies impart manual and automatic selective output control utilizing multiple application assemblies for transportation and motor input equipment with phase angle control element based on three variable elements.

DESCRIPTION OF THE PREFERRED EMBODIMENT

Figure 2:
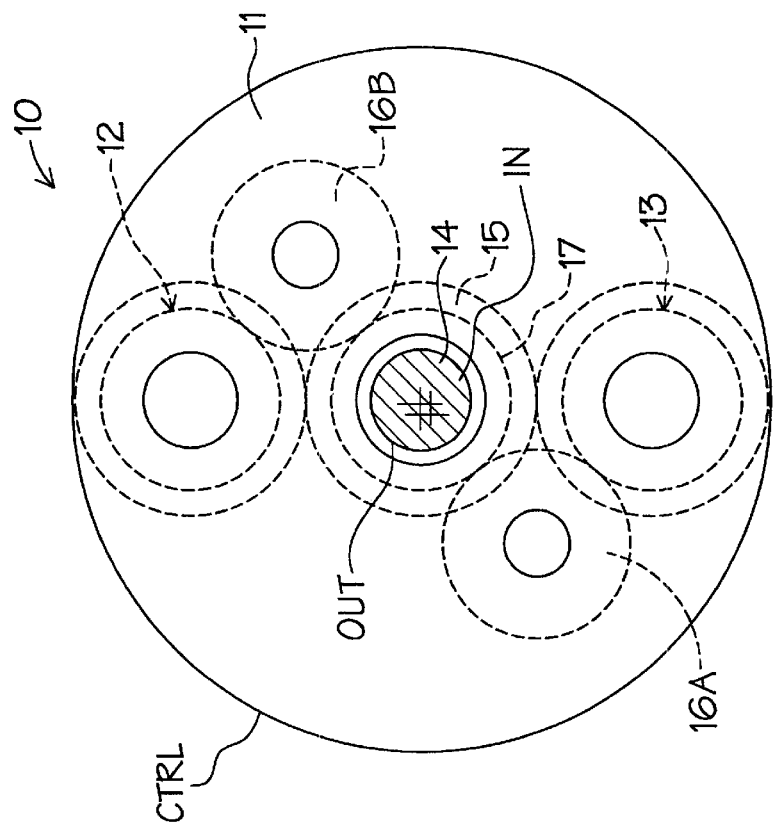
FIG. 2 is a graphic illustration of the principle spur gear elements of the invention.
Figure 1:
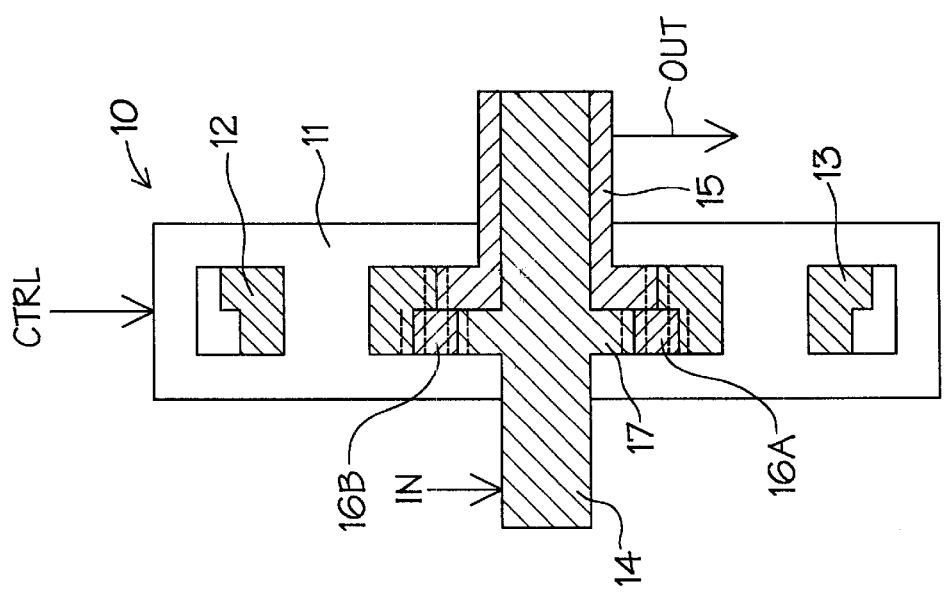
FIG. 1 is a cross-sectional view of the principle spur gear elements of the invention.

Referring to FIGS. 1 and 2 of the drawings, basic elements of the invention can be seen utilizing a spur gear assembly 10 for a rotary motion control having a control bracket 11 with a pair of gears 12 and 13 rotatably positioned thereon. An input shaft 14 extends through the control bracket 11 having an output gear 15 thereon. The output gear 15 engages the respective spur gears 12 and 13 which are in turn engaged by pairs of respective transfer gears 16A and 16B that engage output gear 17 on the input shaft 14. It will be seen that as input is applied to the control bracket 11 the drive transfer is achieved through the respective spur gears 12 and 13. By rearranging input and control, the "basic elements" work as a differential.

Figure 3:
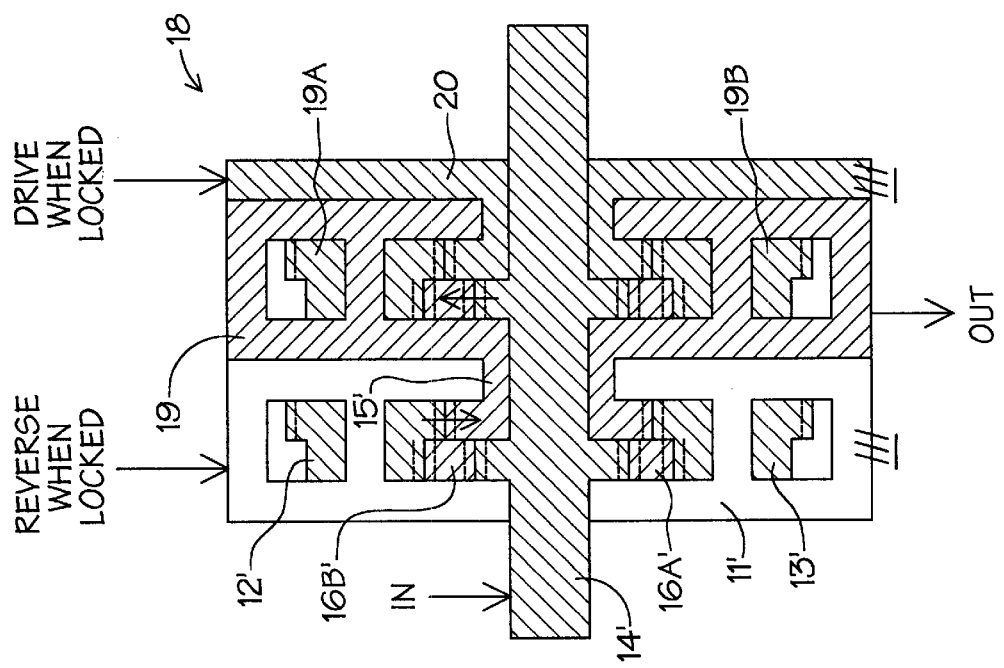
FIG. 3 is a cross-sectional view of combined spur gear elements of the invention.

Referring to FIG. 3 of the drawings, it will be seen that a pair of the gear assemblies 10 are combined to form a directional change clutch assembly 18 in which an output gear 15' is connected to a secondary bracket 19 on which are rotatably positioned gears 19A and 19B. A corresponding output gear 20 and the bracket 19 become control input/output elements. Accordingly, with rotational input on a shaft 14' while holding the bracket 19 (indicated by slash lines), output is achieved through output gear 20. Conversely, by holding the input gear 11' (indicated by slash lines) directional output is achieved by the bracket 19. The gears and bracket elements 12', 13', 16A', 16B' and 11' respectively defined matched ratios in their assembly wherein a one to one ratio is achieved between 14' input and spur gear 12' in same rotational direction while output gear 15' and input shafts 14' are a one to one ratio in the opposite direction. This arrangement achieves selective directional output change on output functionality.

Figure 4:
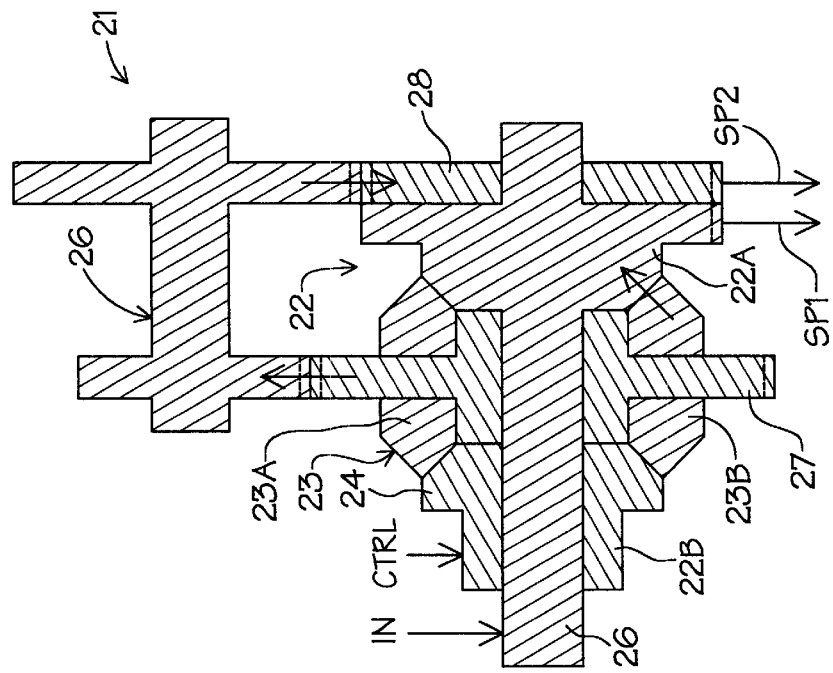
FIG. 4 is a cross-sectional view of a beveled gear phase angle control assembly of the invention.

Referring to FIG. 4 of the drawings, the phase angle control of the invention is illustrated in a bevel gear assembly 21 for continuity purposes. The bevel gear assembly 21 has multiple pairs of inner engaging gears 22 and 23 and control gear 24. Each of said gear pairs 22 and 23 is defined as having oppositely disposed matching gears 22A and 22B in paired gear 22 and interengaging gears 23A and 23B in gear pair 23. An input and support shaft 26 extends through gear 22B and between said respective gears 23A and 23B and is integral with gear 22A rotatably mounting gear 22B and gear pair 23. A transfer gear assembly 26 transfers output from a central support shaft 27 which is freely rotatable on the support shaft 26 to a control gear 28 rotatably positioned on the shaft 26 as illustrated by flow arrows. In this example multiple variable speed outputs via a gear 22A and control gear 28 in the same direction as input on shaft 26 without interfering with input as indicated by arrows SP1 and SP2.

Figure 5:
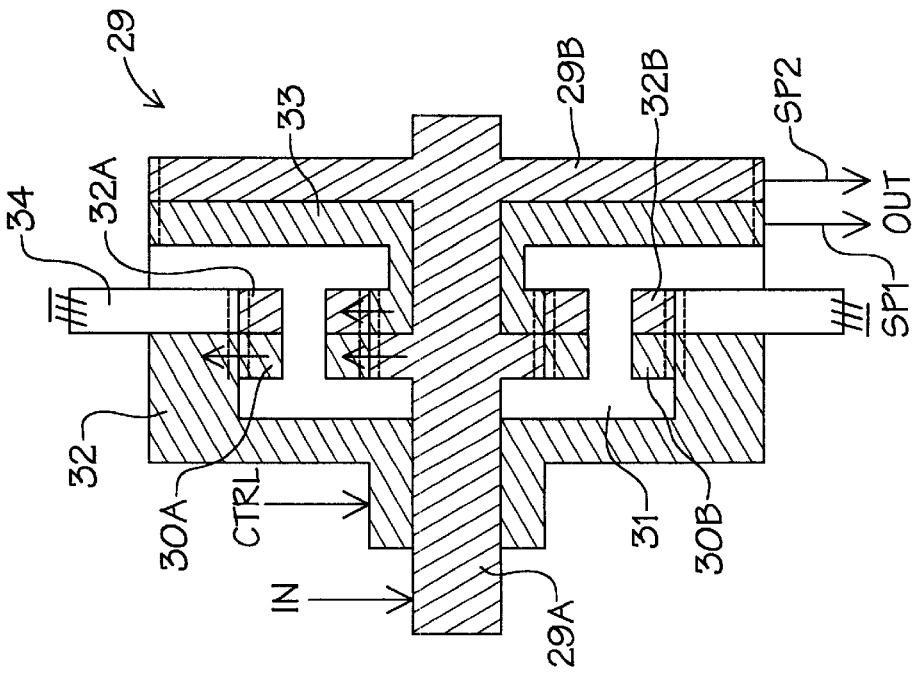
FIG. 5 is a cross-sectional view of a planetary gear phase angle control assembly of the invention.

Referring to FIG. 5 of the drawings, the phase angle control of the invention is illustrated in a planetary gear assembly 29, in this example chosen for illustration, with input on a planetary shaft 29A is transferred to respective planetary gears 30A and 30B on a support bracket 31 as illustrated by flow arrows. A gear control ring 32 controls relative rotation of the support bracket 31 and it's variable output via planetary gears 32A and 32B to output gear 33. A second gear ring 34 is fixed to achieve output as hereinbefore described. Non-controlled output is achieved at output gear 29B on the input shaft 29A as indicated by output arrows SP1 and SP2.

Figure 6:
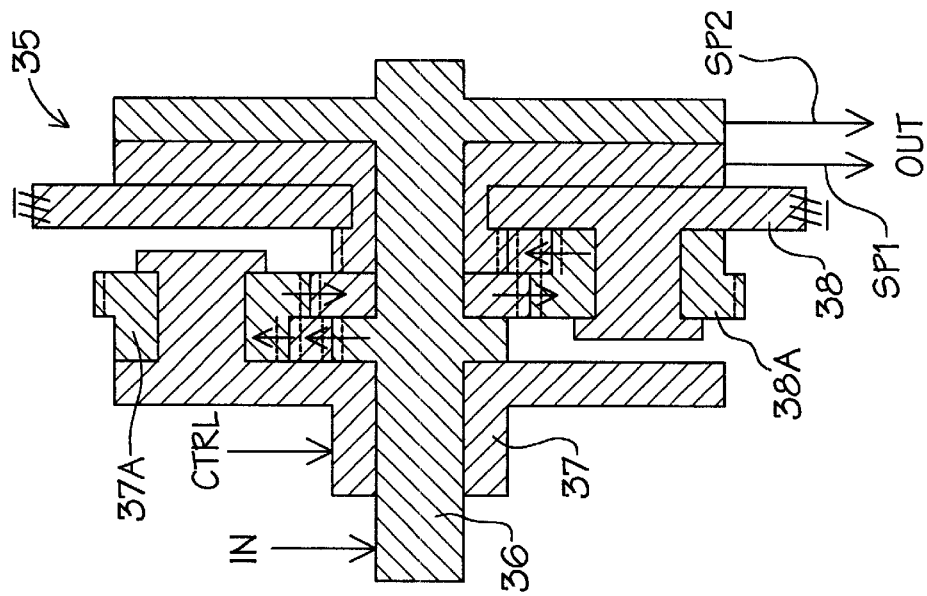
FIG. 6 is a cross-sectional view of a spur gear phase angle control assembly of the invention.

In FIG. 6 of the drawings, the phase angle control of the invention is illustrated in a gear assembly 35 is used to illustrate the phase angle control of the invention using a spur gear 37A on an output control bracket 37 and a spur gear 38A on a secondary control bracket 38. Input on input shaft 36 can be constant or variable. Directional flow arrows are used to indicate motion transfer between gear elements in which variable or constant output is achieved at (SP1) by rotational control of the control bracket 37 with a secondary control bracket 38 being fixed. Output at SP2 is the same as input at shaft 36.

Figure 10:
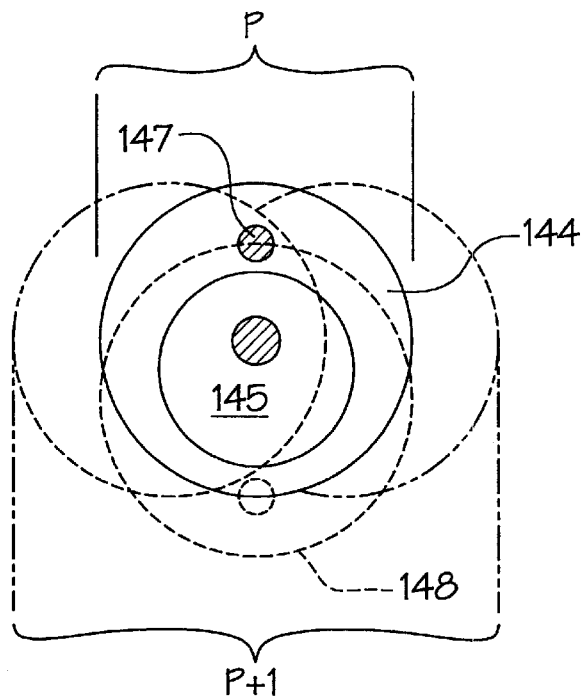
FIG. 10 is a graphical illustration of effective cam orbital paths.

Referring now to FIG. 10 of the drawings, a graphic illustration of the orbital path change brought the basic repositioning of the cams within the respective cam assemblies 39A and 50 of the invention is shown. A representative inner cam 145 and outer cam 146 shown in solid lines with repositioning control pins 147 in the outer cam 146. By repositioning the outer cam 146 in relation to the inner cam 149, 180 degrees as illustrated by the dotted lines at 148, the effective orbital paths are indicated for P to P+1 is shown for axial center pivot point 147 illustrated by broken lines.

It will be evident that phase angle control of the invention as illustrated in the bevel gear arrangement in FIG. 4, the planetary gear arrangement of FIG. 5 and the spur gear phase angle control illustrated in FIG. 6 will produce the same results as that of the spur gear and cam assemblies illustrated hereinafter.

Figure 8:
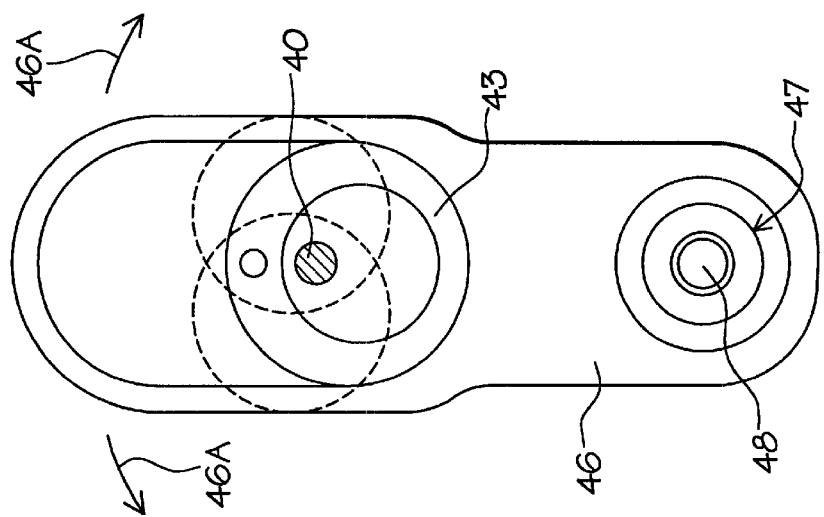
FIG. 8 is a full plan view of a cam follower illustrated in FIG. 7.
Figure 7:
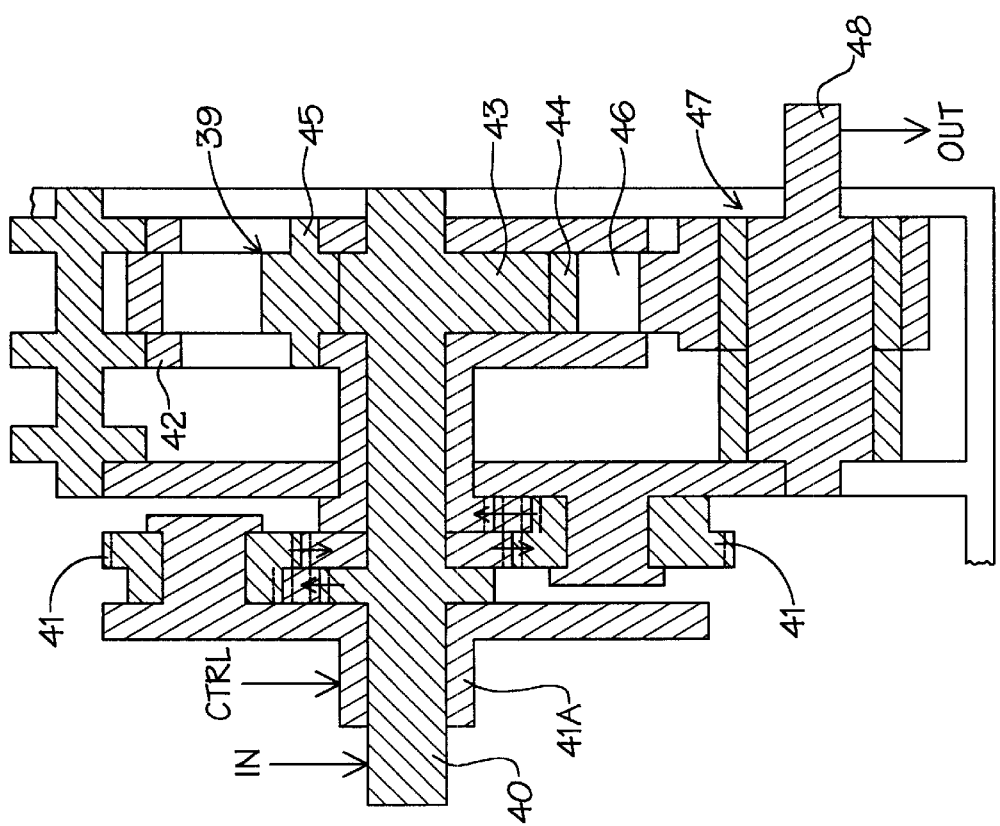
FIG. 7 is a cross-sectional view of the speed control using spur gear assembly as seen in FIG. 6 with a cam control output interconnected thereto.

Referring now to FIGS. 7 and 8 of the drawings, a speed control using spur gear phase angle control as seen in FIG. 6 of the drawings is shown with the addition of cam assembly 39 and one-way clutch bearing output assembly 47. Input on a drive shaft 40 is illustrated following flow arrows imparted to spur gears 41 on a control and support bracket 41A for relative repositioning of cam assembly 39 by slotted control gear disk 42. The cam assembly 39 is set forth in greater detail in applicant's U.S. Patent and is incorporated by reference herein.

Accordingly, the cam assembly 39 has an inner cam 43 with an outer cam 44 and a repositioning pin 45 extending therefrom. As noted, an eccentric cam path can be changed by repositioning input of the slotted control disk 42. A cam follower bracket 46, best seen in FIG. 8 of the drawings, transfers cam rotational output to the one-way clutch bearing assembly 47 providing controlled output at bearing shaft 48. The one-way clutch bearing assembly 47 becomes the pivot point of the cam follower bracket 46 that oscillates as indicated by arrows 46A.

Figure 9:
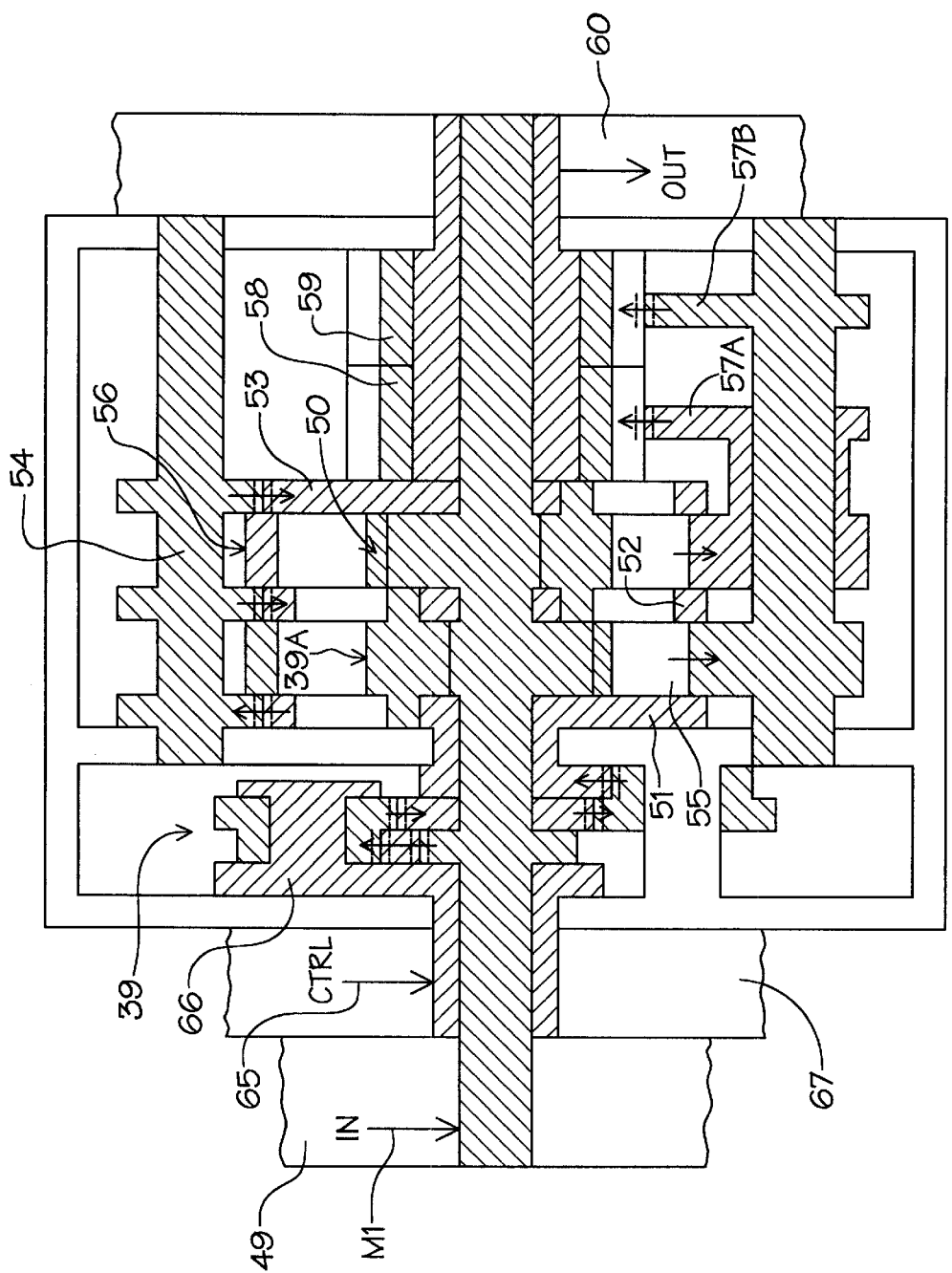
FIG. 9 is a cross-sectional view of the compressor using spur gear assembly of the invention with multiple controlled output cam assemblies.
Figure 11:
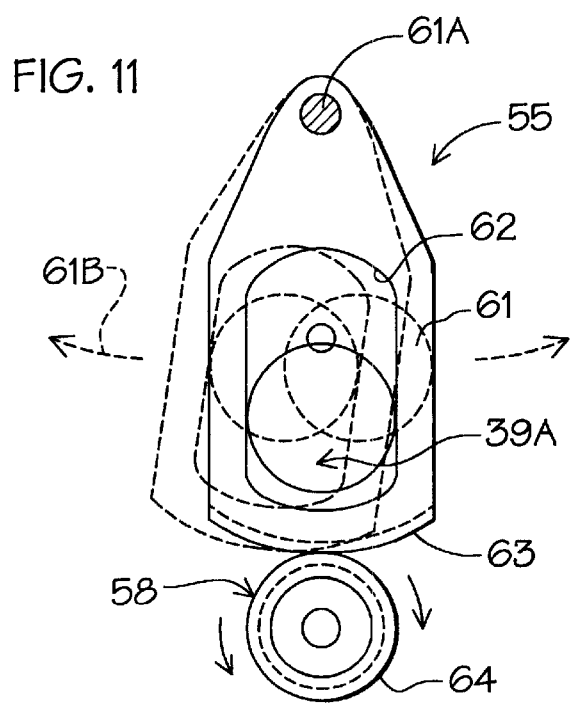
FIG. 11 is a partial front plan view of a cam follower as seen in FIG. 12 of the drawings.

Referring now to FIGS. 9 and 11 of the drawings, a phase angle control is illustrated for a compressor application. In this example, a motor 49 is indicated so as to provide constant input at M1. The spur gears and cam assemblies as shown in FIGS. 7 and 8 of the drawings have been modified for this application at 39A for illustration purposes with a secondary cam assembly 50. It will be seen that the slotted control disks 51, 52, and 53 are interconnected by a transfer gear set 54 indicated by flow arrows. The eccentric cam motion is transferred to a gear transfer sets 57A and 57B and then to a pair of one-way clutch bearings 58 and 59 for output to a compressor pump indicated at 60. The cam followers 55 and 56 both have a main frame 61 with a pivot point 61A. An enlarged opening at 62 receives the outer cam of the respective cam assemblies 39A and 50 as they oscillate as indicated by directional arrows 61B. A geared surface 63 is engageable on a corresponding geared surface 64 of the one-way bearings 58 and 59. It will be seen that by control input at 65 to a control bracket 66, the effective reciprocation of the relative rotational position of the slotted control disks 51, 52 and 53 can be changed and thereby cam's path would vary the output of the rotational speed on the one-way clutch bearing assemblies 58 and 59 hereinbefore described.

Control input at 65 in this example corresponds with a thermostat (temperature) input generally illustrated at 67.

Figure 12:
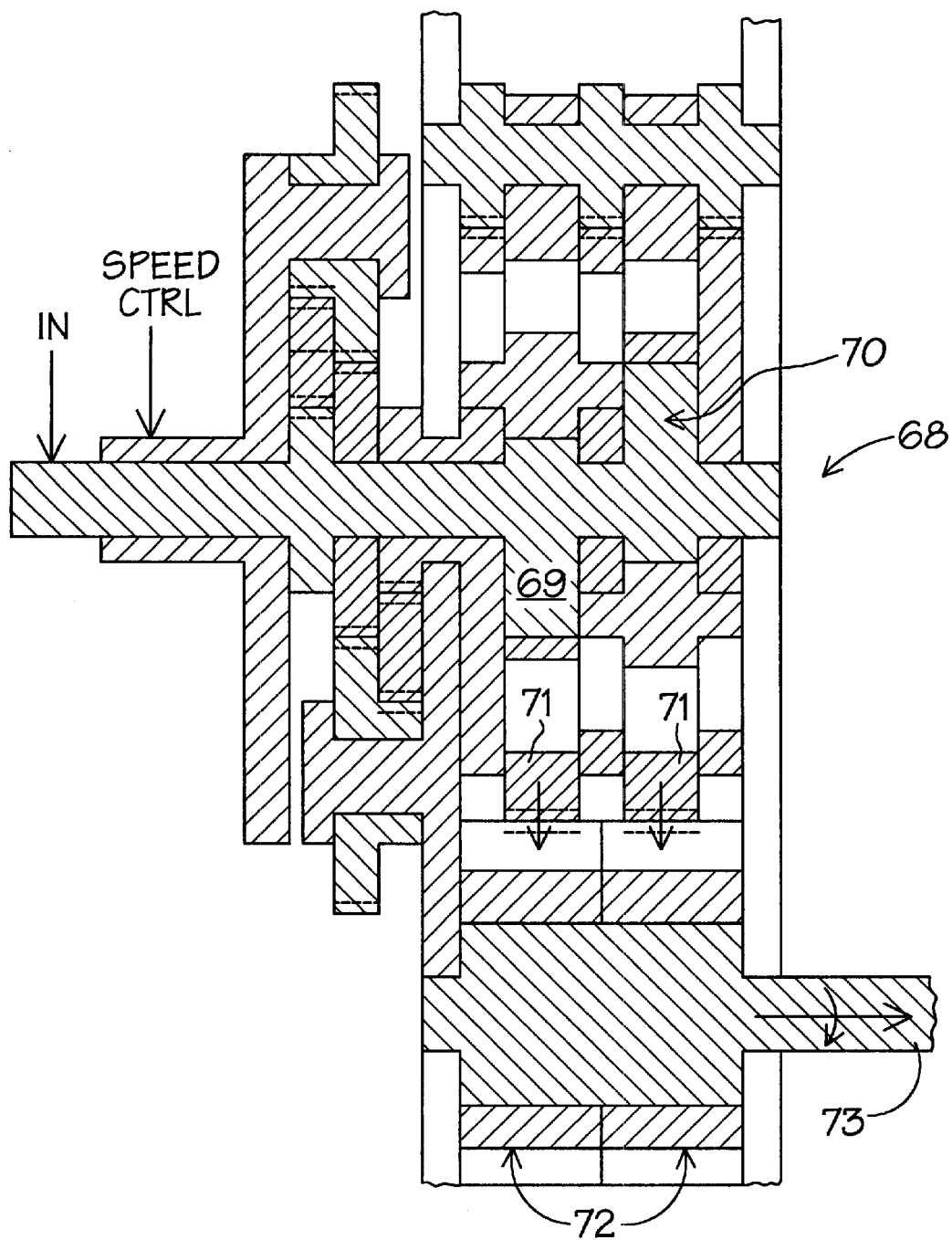
FIG. 12 is a full cross-sectional view of a CVT manual using input control cam assembly and graphic illustration of a directional control manual adjustment.
Figure 12A:
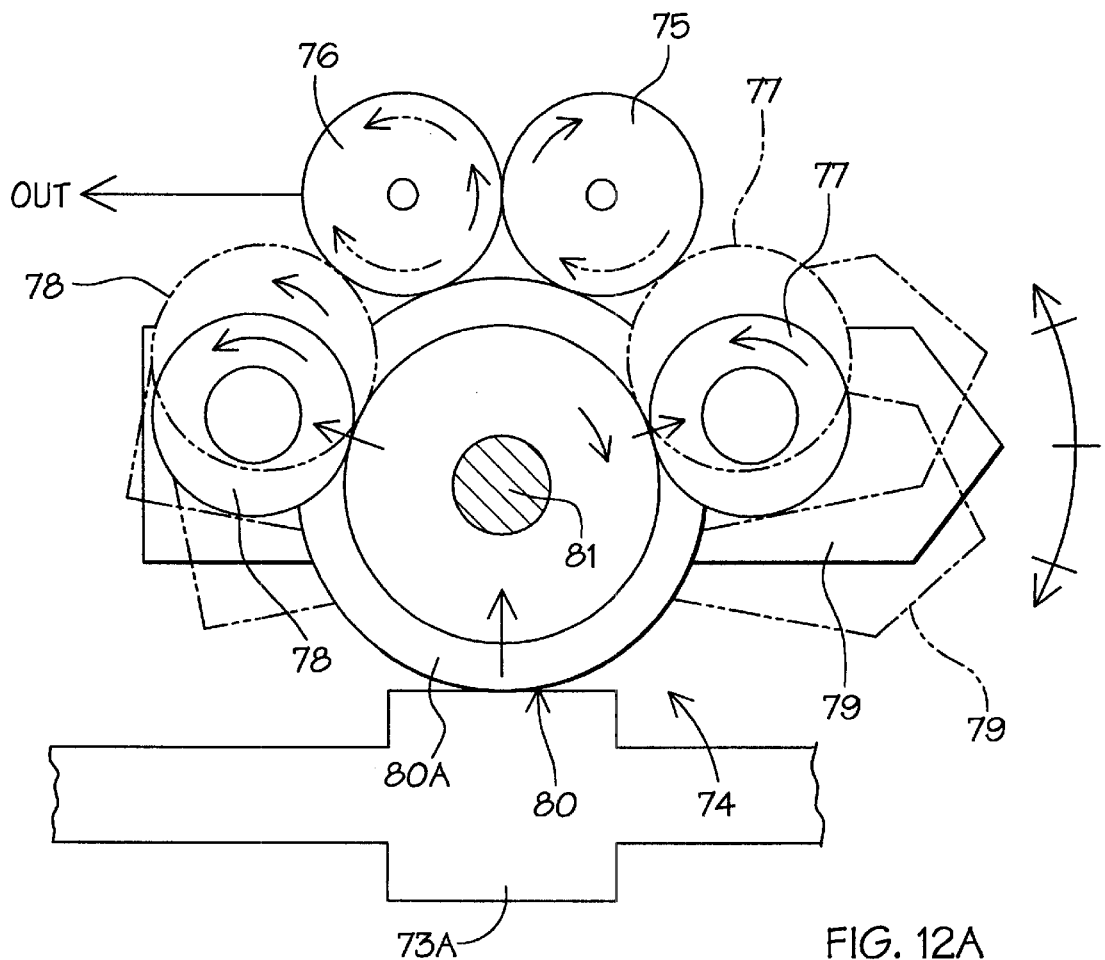

Referring now to FIG. 12 of the drawings, the phase angle control of the invention is illustrated for a constantly variable transmission (CVT) assembly 68 application with directional control wherein only the cam assembly portion 69 and 70 are shown which are identical to that as the hereinbefore illustrated and described cam assemblies 39A and 50 illustrated in FIG. 9 of the drawings.

A direct engagement of the cam followers 71 are shown here with a pair of one-way clutch bearing assemblies 72 connected for output to a drive shaft 73. A manual directional change assembly 74 (MDCA) is graphically illustrated connected to the output drive shaft 73 for useable directional control. The MDCA 74 has a pair of interengaging outlet gears 75 and 76 that are selectively engaged by respective drive outlet gears 77 and 78 on an actuation arm 79. The drive outlet gears 77 and 78 are in turn driven by a transfer gear assembly 80 in communication with the clutch bearing drive shaft 73 by gear 73A. Worm gear 73A is driving pinion gear 80A to produce engine braking output. The actuation arm 79 is pivoted at 81 so as to selectively move the respective outlet gears 77 and 78 into engagement with respective drive outlet gears 75 and 76 imparting directional output control as illustrated by broken line arrows thereon. A neutral or idle position is illustrated in solid lines with the respective output position illustrated in broken lines at 77 and 78.

Figure 13:
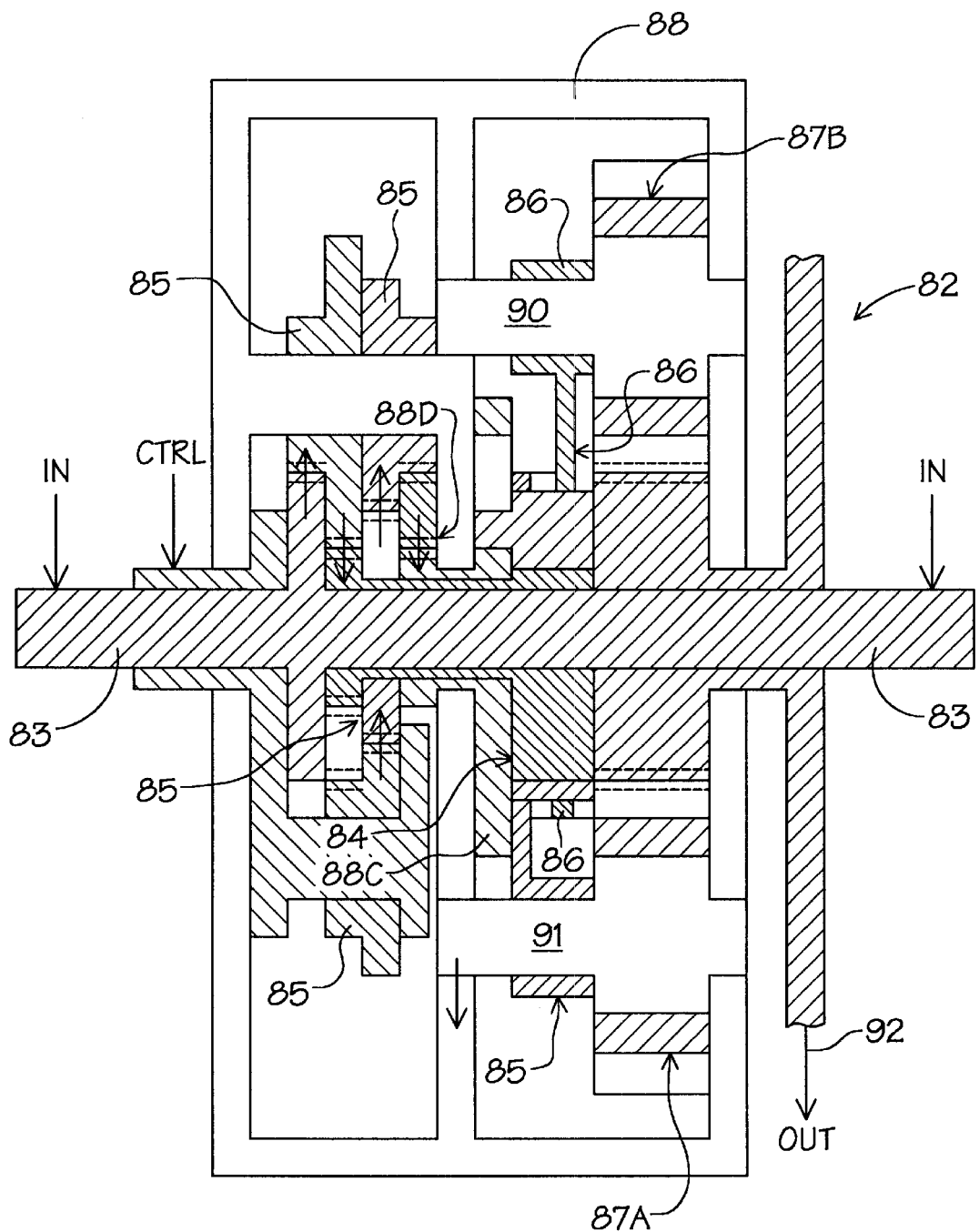
FIG. 13 is a cross-sectional view of a bicycle using spur gear control cam assembly with alternate cam followers.
Figure 14:
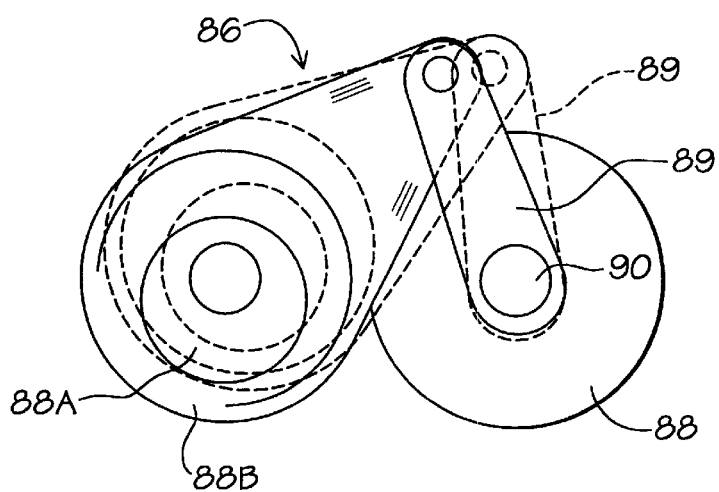
FIG. 14 is a graphic illustration of the cam follower assembly as seen in FIG. 13 of the drawings.

Referring now to FIGS. 13 and 14 of the drawings, a further application of the phase angle control of the invention is illustrated by applying same to a bicycle drive assembly 82. An input shaft 83 drives a cam assembly 84 as indicated by the flow arrows through spur gears generally indicated by 85. Cam assembly 84 has in this application has four pairs of oppositely disposed cam follower assemblies 86, best seen in FIG. 14 of the drawings that transfer the eccentric cam motion directly to respective one-way clutch bearing assembly 87A for selective output at to the bicycle wheel 88.

The cam follower assemblies 86 are pivotally connected to respective link arms 89 that extend from respective one-way bearing shafts 90 and 91 which outputs (indicated by arrow 92) to the bicycle wheel indicated generally in this illustration as at 88.

As set forth previously, control of the cam assembly 84 is achieved by the repositioning of an inner cam 88A in relation to an outer cam 88B by slotted control gear 88C and its associated gear assembly 88D as indicated by flow arrows as hereinbefore described.

Figure 15:
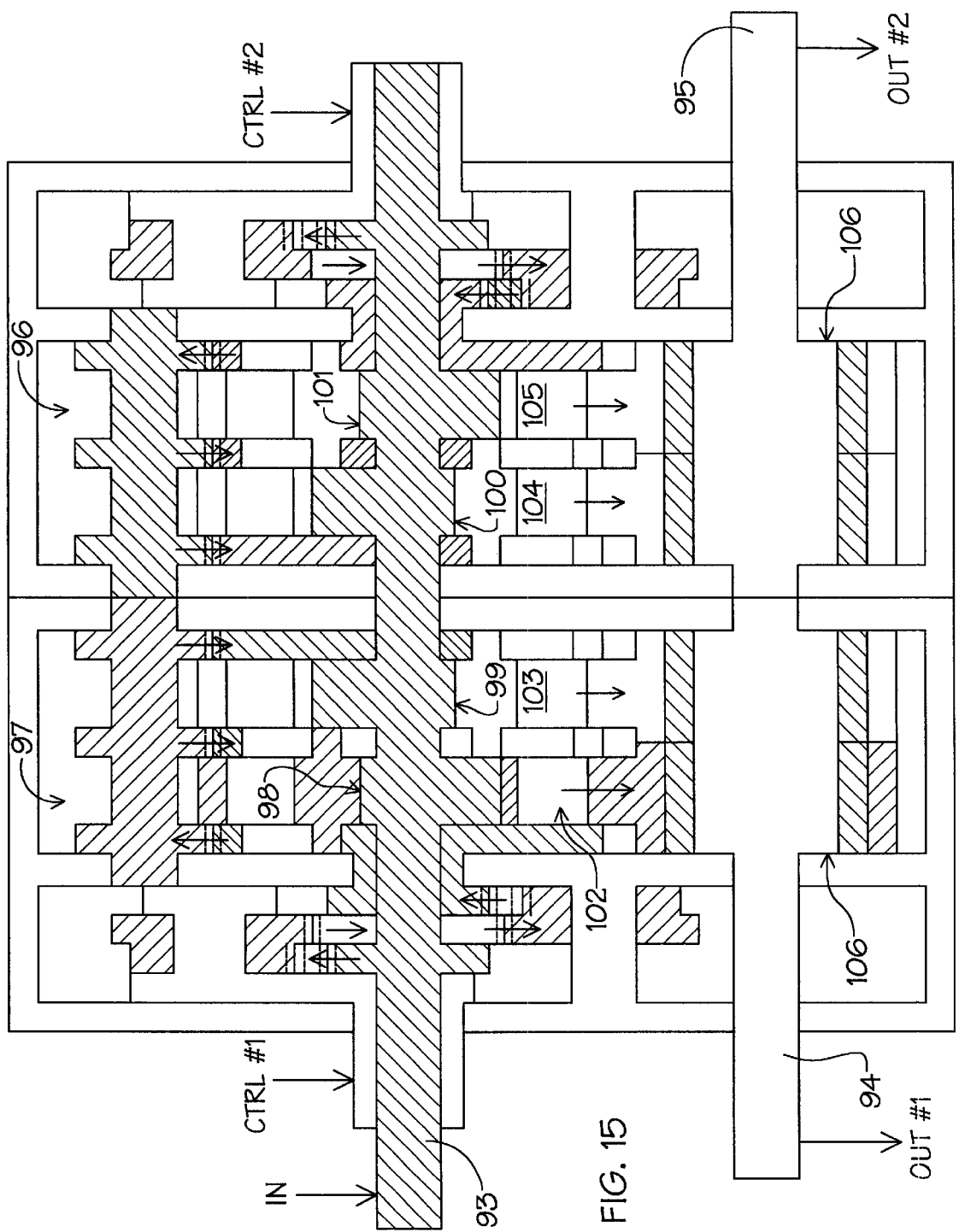
FIG. 15 is a cross-sectional view of a power take-off assembly using dual spur gear control cam assemblies of the invention.

Referring now to FIG. 15 of the drawings, a different application can be seen wherein multiple elements of the invention are used in parallel allowing for use in a variety of different environments and venues. The application illustrates the use as a power take-off (PTO) with a single input at 93 can have a pair of independently controlled outputs at 94 and 95. Essentially, the main input and control cam arrangement of the invention as hereinbefore described is duplicated at assemblies 96 and 97 with the single input shaft 93 having multiple cam assemblies 98, 99, 100 and 101 thereon. As noted, variable output (speed) is regulated by cam relationship output through cam followers 102–105 to one-way clutch bearing pairs 106 for each of the outputs 94 and 95 as indicated by respective flow and control arrows in the drawings. Such constant input with multiple constantly variable outputs (CVO) arrangements can be used in a variety of practical application systems that require multiple independent operations that can now be achieved with one input as illustrated.

Figure 19:
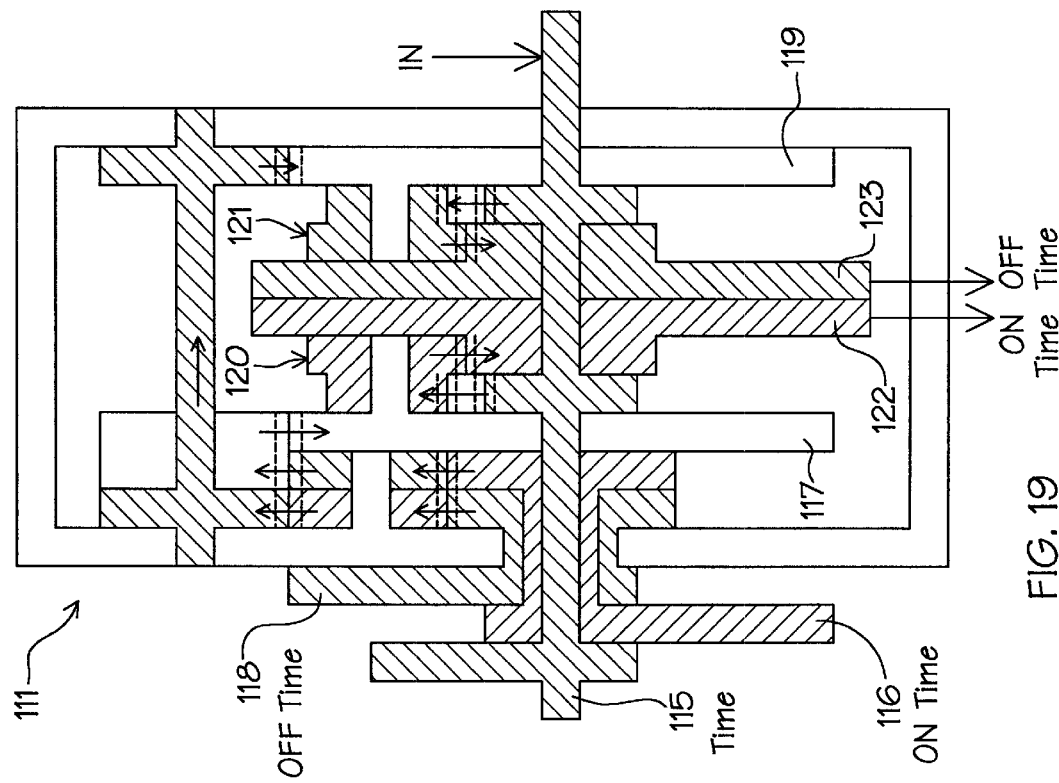
FIG. 19 is a cross-sectional view of the cycle timer set forth in FIG. 18.
Figure 18:
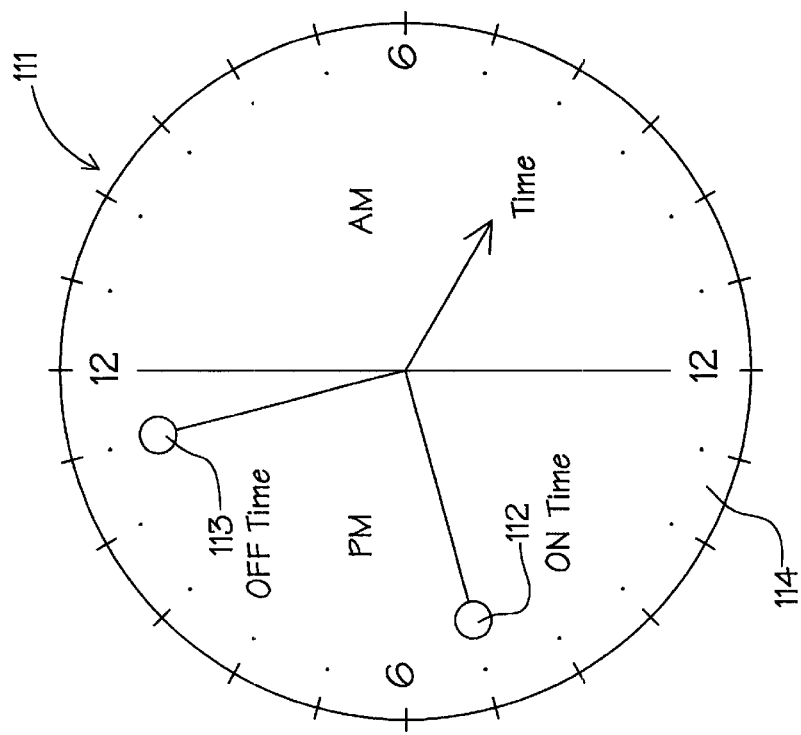
FIG. 18 is a graphic clock face illustration of a cycle timer using input and control assemblies of the invention.

Another example of the multiple use of the basic control system of the invention can be seen in FIGS. 18 and 19 of the drawings wherein system elements arranged in parallel are used to function as a cycle timer 111. Referring to FIG. 18 of the drawings, a preset "ON" time at 112 and "OFF" time at 113 are illustrated on a clock representation face 114. Referring correspondingly to FIG. 19 of the drawings, the input (time drive) via a time drive shaft 115 "on" time controls at gear 116 which by following the flow arrows repositions a control bracket 117. Accordingly, an "OFF" time control input indicated at 118 repositions a control bracket 1 19. Electric circuit (not shown) activation and de-activation is illustrated by respective interengaging gear assemblies 120 and 121 with output circuit switch (not shown) is achieved at cam 122 for "ON" and cam 123 for "OFF" as will be well understood by those skilled in the art given the above detailed description. The same interdependency and basic gear elements hereinbefore illustrated of the invention are used in an alternate cycle time parallel arrangement.

Figure 16:
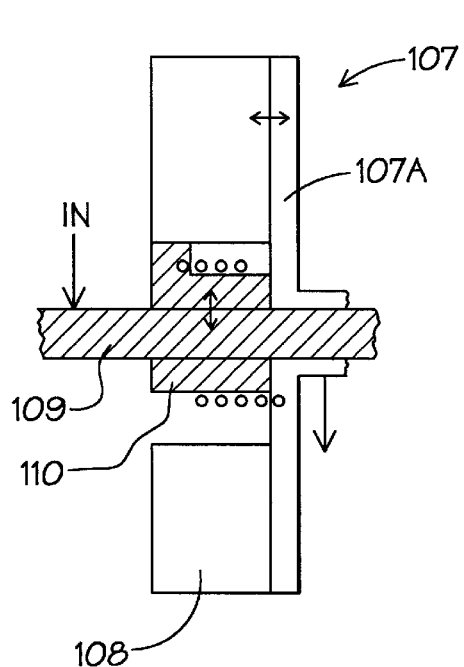
FIG. 16 is a partial cross-section graphic view of an automatic control input assembly of the invention.
Figure 17:
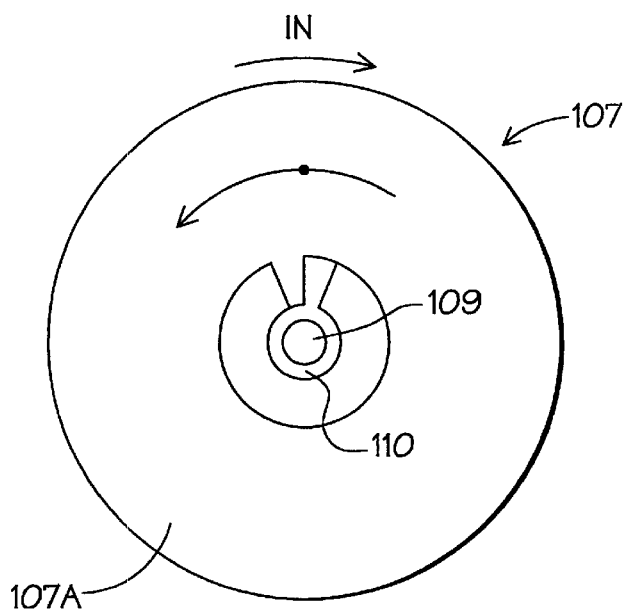
FIG. 17 is a graphic illustration of the automatic control input assembly illustrated in FIG. 16.

Output can be of an automated or of a manual nature wherein changes of input velocity (i.e. variable input) will be used to effect control by use of a spring loaded weight control assembly 107 (illustrated as an example, but not limited thereto) in FIGS. 16 and 17 of the drawings.

In this example, a control element output 107A shall be determined based on the divergency i.e. the degree of separation between a spring interconnected mass element 108 which is attached to bracket 107A and rotational force of an input shaft 109 connecting fitting 110 indicated by the respective arrows in FIG. 17 of the drawings. As the rotational input varies the degree of separation will change accordingly, thus varying the control of the output in proportional relationship thereto.

Figure 20:
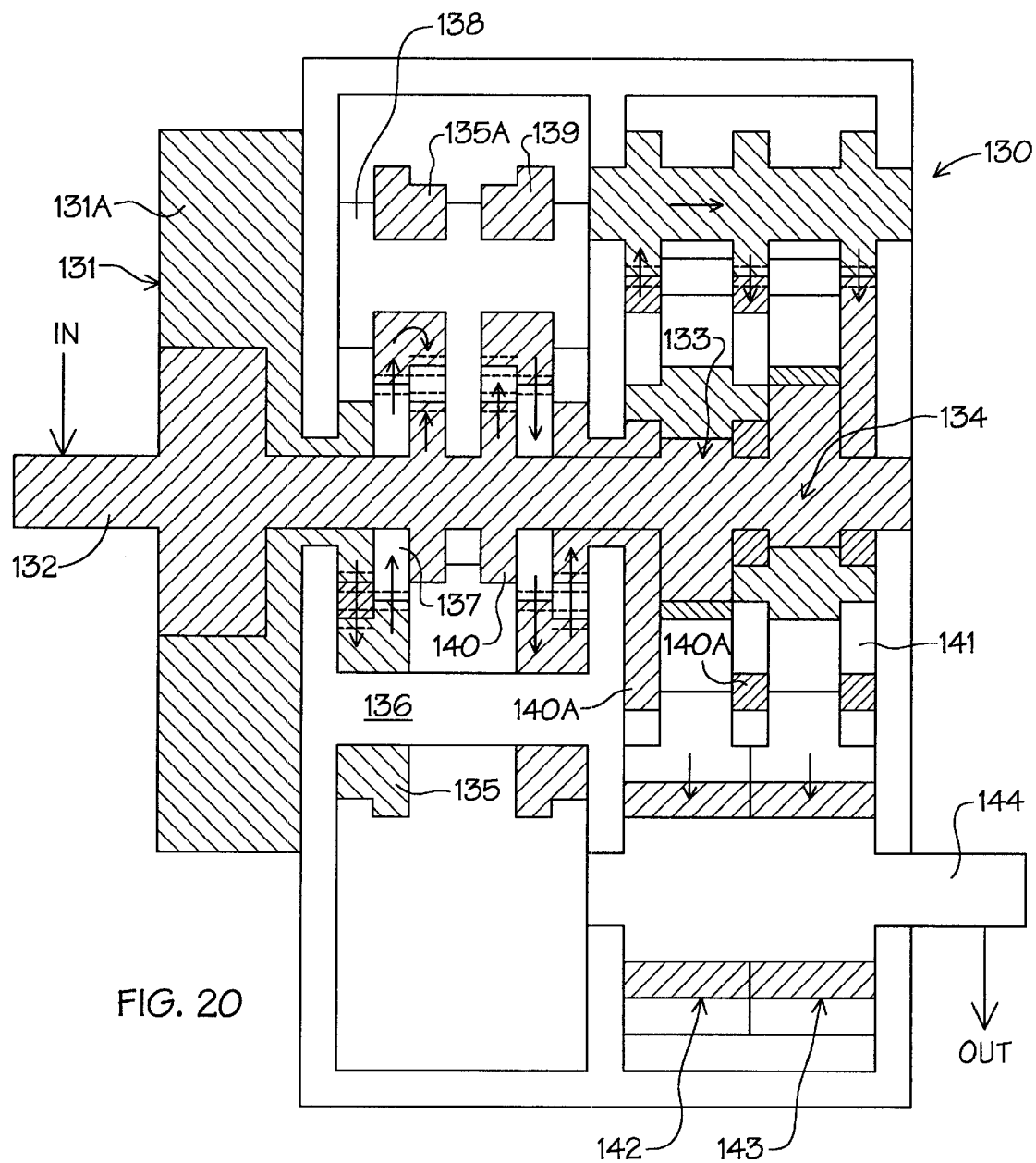
FIG. 20 is a cross-sectional view of a variable input variable output automatic controlled multiple cam spur gear assembly of the invention.

Referring to FIG. 20 of the drawings, a further variation of the gear elements of the invention can be seen wherein a variable input, variable output automatic control assembly 130 is illustrated. An automatic control assembly 131 is interconnected to a variable input shaft 132. A pair of automatic cam assemblies 133 and 134 on the variable input shaft 132 are identical to the hereinbefore-described cam assemblies 69 and 70 shown in FIG. 12 of the drawings. The repositioning of the respective cams is controlled by the automatic control assembly 131 having a differential weight 131A engaging a control gear 135 on a support bracket 136. A transfer gear 137 is engaged by a control gear 135A on a control bracket assembly 138. A second control gear 139 on the control bracket 138 is correspondingly engaged by a variable input gear 140 on the variable input shaft 132 as indicated by the flow arrows in the drawings. The differential ratio between the variable input on the variable input shaft 132 and connected weight 131A of the automatic control assembly 131 will reposition selective control disks 140A and 141 of the respective assemblies. The automatic cam assemblies 133 & 134 output to one-way clutch bearings 142 and 143 as indicated by flow arrows to deliver variable output on the one-way bearing output shafts 144.

It will thus be seen that a variable speed transmission and variable speed gear assembly in multiple forms has been illustrated and described and it will be apparent to those skilled in the art that various changes and modifications may be made thereto without departing from the spirit of the invention.

Therefore I claim:

1. A variable speed change gear assembly comprising, a main shaft, a principle gear element comprising a plurality of spur gears within support input brackets engageable by output gears and control gears on the main shaft, an adjustable camming assembly interconnected to said main shaft and said control gears, said camming assembly comprise a pair of interengaging cams, pins extending from one of said cams registerable in a slotted control disk on said control gear, cam followers on said interengaged cams, drive transfer means engaged by said cam followers, directional input and output means selectively engaging said output means.

2. The variable speed change gear assembly set forth in claim 1 wherein said principle gear element further comprises a first support input bracket and a second support input bracket, said control gears driving said second support input bracket, one of said control gears rotatable on said main shaft defining directional change output assembly by selective input source to said main shaft and said first support input bracket.

3. The variable speed change gear assembly set forth in claim 2 wherein said directional change output assembly comprises a first directional output on said secondary support input bracket and a secondary opposite directional output on one of said control gears rotatable on said main shaft.

4. The variable speed change gear assembly set forth in claim 1 wherein said drive transfer means engaged by said cam followers comprises a one-way clutch bearing.

5. The variable speed change gear assembly set forth in claim 1 wherein said directional input/output means selectively engaging said output means comprises, an activation arm having a main transfer gear rotatably positioned thereon a pair of drive gears on said arm registerable with said main transfer gear, interengaging final directional output gear selectively engaged by said respective drive gears upon selective repositioning of said activation gears from a first non-drive position to a respective selective directional drive positions.

6. The variable speed change gear assembly set forth in claim 1 wherein said cam follower comprises an elongated flat apertured body member registerable over respective said interengagement cams, means for engagement of said cam followers with said drive transfer means.

7. The variable speed change gear assembly set forth in claim 6 wherein said means for engagement of said cam followers with said drive transfer means comprises an engagement fitting engageable on said drive transfer means.

8. The variable speed change gear assembly set forth in claim 6 wherein said means for engagement of said cam followers with said drive transfer means further comprises, an arcuate geared perimeter surface on said cam follower adjacent a cam engagement aperture.

9. The variable speed change gear assembly set forth in claim 6 further comprises link arms interconnecting an output transfer aperture with said drive transfer means.

10. The variable speed change gear assembly set forth in claim 1 wherein said principle gear element in defines a cycle timer having a time drive shaft, a control input on gear and a control output off gear rotatably positioned about said drive shaft, control brackets engageable by said respective on and off input gears and repositionable thereby, said output and on gears interengaged by said time drive shaft.

11. A variable speed change gear assembly comprises, a main variable speed input shaft, an automatic control assembly interengaged on said input shaft, a plurality of spur gears on multiple support and control brackets, adjustable camming drive assemblies interconnected to said control automatic assembly, a variable camming drive output assembly interconnected to said control assembly, said variable drive camming output assembly comprising interengaging cams, pins extending from said cams registerable in slots within control disks, cam followers on said interengageable cams, drive output transfer means engaged by said cam followers.

12. The variable speed change gear assembly set forth in claim 11 wherein said automatic control assembly comprises, a control weight interconnected to said main variable speed input shaft by spring means, said control weight engageable with said spur gears on said support and control brackets.

13. The variable speed change gear assembly set forth in claim 11 wherein said drive output transfer means engaged by said cam followers comprises, one-way clutch bearing assemblies providing variable speed output in respect to variable speed input by said control assemblies.

* * * * *